May 24, 1932.   D. ELDER   1,859,357
WATER REGULATOR
Filed May 17, 1930   2 Sheets-Sheet 1
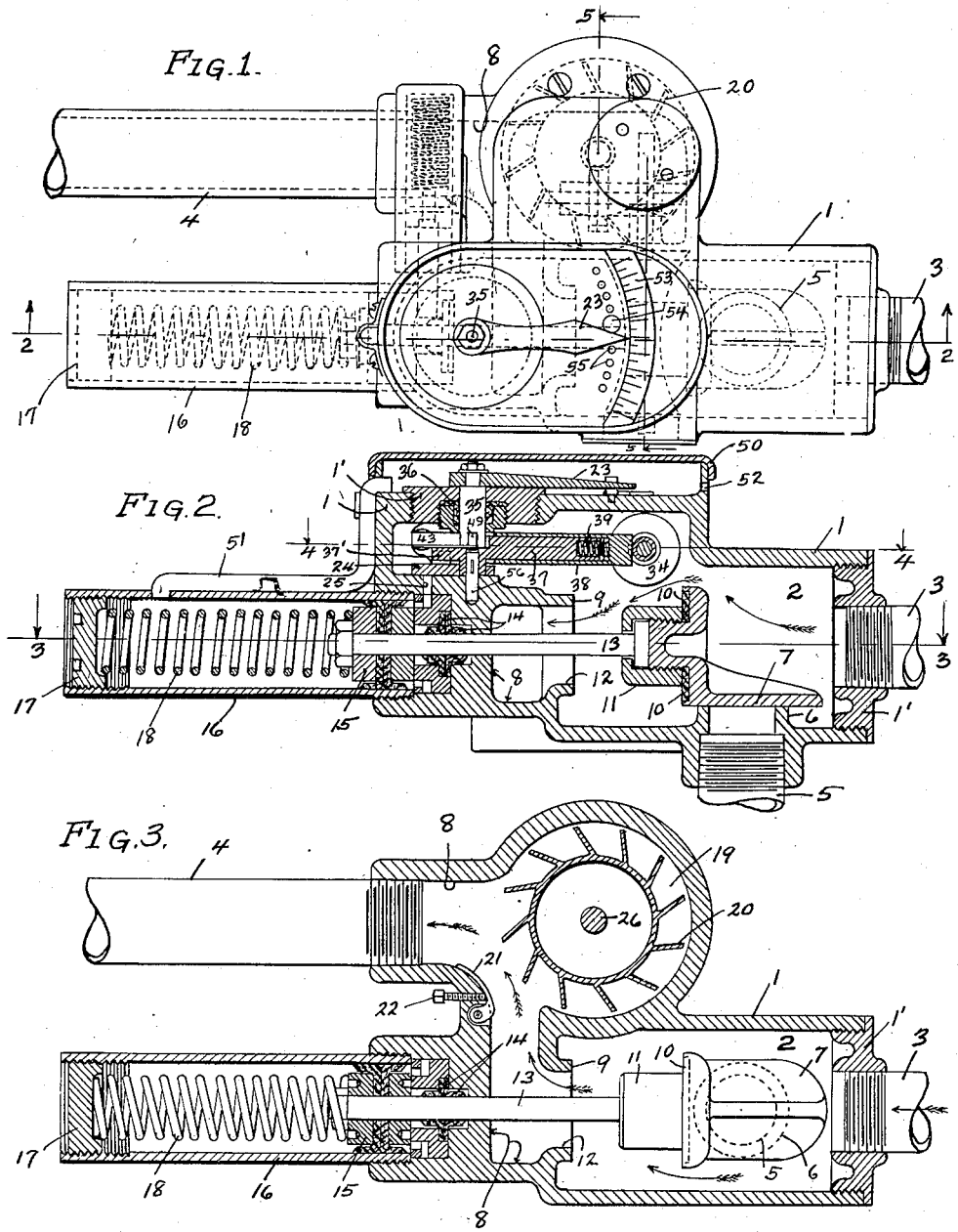
INVENTOR.
DONALD ELDER
BY
ATTORNEYS.

May 24, 1932.  D. ELDER  1,859,357

WATER REGULATOR

Filed May 17, 1930  2 Sheets-Sheet 2

INVENTOR.
DONALD ELDER
BY Miller Boyken & Bried
ATTORNEYS.

Patented May 24, 1932

1,859,357

UNITED STATES PATENT OFFICE

DONALD ELDER, OF BERKELEY, CALIFORNIA

WATER REGULATOR

Application filed May 17, 1930. Serial No. 453,186.

This invention relates to automatic water flow control apparatus as used to regulate the flow of water to several sprinkler heads, and has for its objects improvements whereby the action of the apparatus is more dependable, the structure is more compact, accessible in its parts and will give a wide variation in time control of flow. Other objects appear in the following specification and the accompanying drawings.

In the drawings Fig. 1 is a plan view of the regulator.

Fig. 2 is a longitudinal section of Fig. 1 taken along the line 2—2 thereof.

Fig. 3 is a longitudinal section of Fig. 2 taken vertically through Fig. 1 or along the line 3—3 of Fig. 2.

Figure 4:
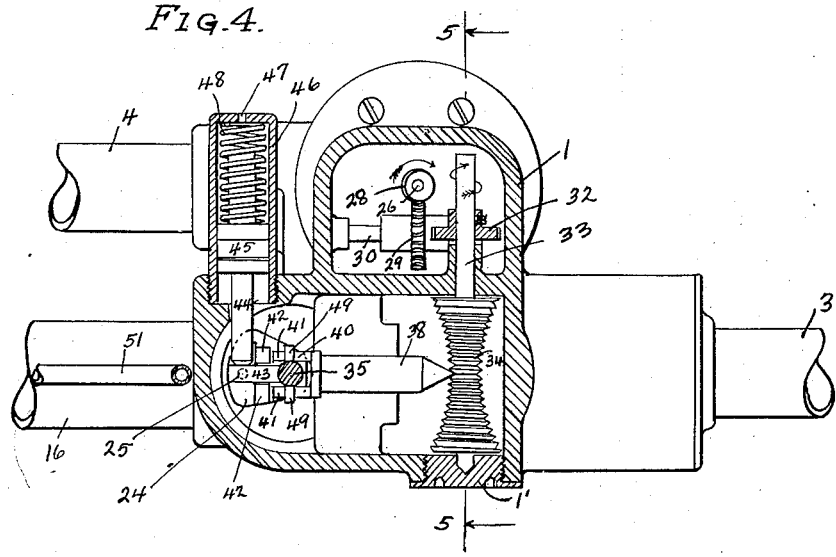
Fig. 4 is a cross section of the apparatus as seen from the line 4—4 of Fig. 2.
Figure 5:
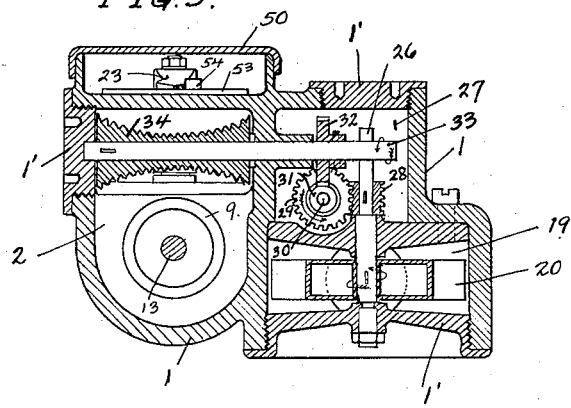
Fig. 5 is a cross section taken along the line 5—5 of Fig. 4.

Briefly described the apparatus is of that type shown in my copending patent filed under Serial Number 440,748 and functions in a similar way in regulating or controlling the flow of water to a sprinkler head or heads for a period of time and then switching the flow to another sprinkler head or heads and at one of which latter heads a similar device functions similarly until all the sprinklers in the system have operated, and upon which event they are all held closed by water pressure until such time as a definite drop in water pressure occurs in the line and whereupon the regulators automatically reset themselves for a repetition of the cycle as outlined.

With reference to the drawings, the apparatus comprises a hollow body or housing 1 providing a main water chamber 2 with an inlet from pipe 3, sprinkler outlet through pipe 4 and line outlet connected to pipe 5.

Outlet to pipe 5 is formed into a valve seat 6 on which is shown seated a slide valve 7, while the outlet to pipe 4 comprises a cored passage 8 formed with a valve seat at 9 adapted for seating thereagainst of a disk valve 10 carried on the end of sliding valve 7 and formed with a neck 11 adapted to extend into the throat 12 of water passage 8 when the disk valve is seated upon seat 9, the spacing of seats 6 and 9 being such as to open either valve upon closure of the other.

Valve 10 is provided with a stem 13 which extends through water passage 8, through packing leathers 14, and has a piston 15 secured to its outer end slidably operating in a cylinder 16 closed at its outer end by a screw plug 17 and containing within a compression spring 18 reacting between the plug and the piston so as to normally slide valve 7 to close outlet 5 and open passage 8 to chamber 2. Plug 17 affords adjustment for spring 18.

Adjacent to chamber 2 is a circular chamber 19 open at one side to passage 8 and in which circular chamber is rotatably mounted a waterwheel 20 with one edge extending into the water passage 8 so that the wheel will be rotated by flow of some of the water passing to pipe 4, and to vary the effectiveness of which flow upon the waterwheel I provide an adjustable blade 21 at the juncture of chamber 19 and passage 8 with a screw 22 bearing against the blade so that it can be adjusted from outside of the housing to control the amount of flow which is active upon the wheel, so as to provide for most of the water flowing freely to outlet pipe 4 and just the required minimum being diverted to operate the wheel.

This wheel is the water driven element of a series of timing gears whereby the duration of the open position of valve 10 is determined, and after a certain number of rotations depending on the setting of a certain indicator hand 23, a small sector-like slide valve 24 is opened to uncover a port 25 and thereby permit water under pressure from the chamber 2 to enter behind piston 15 and force same outwardly while compressing spring 18, moving valve 10 toward closing position and valve 7 toward open position.

In order to carry out the operations of the preceding paragraph waterwheel 20 is secured to an axle 26 extending through chamber 19 into a timing gear chamber 27 and carrying a worm 28 meshing with a wormwheel 29 carried on a countershaft 30 also having secured to it a worm 31 in mesh with a wormwheel 32 secured to a shaft 33 which extends from gear chamber 27 back into main chamber 2 wherein it has secured to it a special worm or concave threaded member 34.

This special worm is curved from the axis of a crank shaft 35 which passes through packing leather 36 in the side wall of the housing and outwardly thereof carries indicator arm 23. Mounted on a pin 56 aligned with the axis of shaft 35 and on line with the special worm 34 is an arm 37 telescoping over which is a hollow arm 38 resiliently forced outward by a compression spring 39. Hollow arm 38 is formed with a wedge-like outer end engaging the thread of the special member 34, and at its opposite end it is formed into a yoke 40 passing to opposite sides of shaft 35, as shown best in Fig. 4, and formed with upwardly extending yoke ends 41 both lying to the rear of this shaft.

Arm 37 has a hub free on shaft 35 and a rear extension 37' which is positioned between two lugs 42 formed on top of the flat sector-like valve 24 which controls port 25, while shaft 35 terminates just above arm 37 and has a rearwardly extending crank or shaft offset 43 engaging the stem 44 of a small plunger 45 operating in a cylinder 46 vented at 47 to atmosphere and containing a compression spring 48 resiliently forcing the plunger outward when the water pressure in chamber 2 acting against the outer end of the plunger permits.

Crank shaft 35 is also provided with a pair of oppositely projecting pins 49 extending just forward of the upturned portions 41 of the yoke 40 so that when the indicator arm 23 is moved to turn shaft 35 the first effect produced will be to collapse the telescope arm 38 so that it will be withdrawn from engagement with the thread of the special worm 34 and after which the telescopic arm and valve 24 will be revolved to whatever setting is desired until by release of turning effort on indicator arm 23 the telescopic arm 38 will reengage the thread of the worm at the new setting.

The indicator arm is positioned on top of the housing for accessibility from the surface of the ground in which it is ordinarily buried when connected in a lawn sprinkling system, and a cover 50 is provided to keep out dirt.

When piston 15 is forced outwardly it will tend to compress air in cylinder 16 and to avoid this a small vent tube 51 is extended from the outer portion of the cylinder to the space under the cover 50 and which space itself may be vented by a small hole as at 52 or by having the cover fit loosely in place.

A timing scale 53 is arranged at the end of the indicator arm and preferably also an adjustable stop so that the arm may always be reset to some predetermined point by swinging it until it strikes the stop. Such a stop is here indicated by a small peg 54 which may be placed in any of a row of holes 55.

To aid in construction and assembling, various parts of the housing are threaded to the main body 1, such parts being designated 1' in the drawings.

In operation of the apparatus, starting from position shown in Fig. 2, water from supply pipe 3 flows freely to pipe 4 feeding one or more sprinkler heads, and after a time dependent on the setting of the indicator arm, valve 24 opens port 25, piston 15 is at once moved outward until nose 11 of valve 10 enters neck 12 and at which point the entire force of water back of valve 10 at once closes it, thus shutting off pipe 4 and opening pipe 5 which may lead to another sprinkler head or heads similarly controlled.

When finally a series of "regulators" have thus operated all remain shut off by static water pressure until this pressure is broken by some other means not involved in the present invention, but as soon as the pressure is broken spring 18 opens valve 10, closes valve 7 and spring 48 resets the indicator arm to the stop 54 so that upon again starting the pressure from some extraneous control the series of regulators will again function as described. The period of time of sprinkling for which each is set will be repeated automatically.

While in operation valves 24 and 7 are held in tight sliding contact with their seats by water pressure, the stem connection 13 of the double valves 10 and 7 is made a loose fit to give valves freedom for seating.

It should be noted that in this apparatus there are no needle valves or restricted liquid passages to control the timing, also that the end of telescopic arm 38 is pulled out of the timing thread of the special worm in whichever direction the arm is turned, thus there is no wear upon these parts, as the only work done by the thread is to slide the sector-like valve 24 to open the small port 25 which takes very little effort.

Having thus described my invention, it will be seen to be an apparatus wherein minor changes may be made without affecting the mode of operation or going without the spirit of the invention as expressed in my appended claims.

I claim:—

1. A water regulator comprising a hollow body having a water chamber with an inlet and outlet passages, connected valve means arranged for closing one of said passages and opening the other successively, a stem on said valve means provided with a piston, a cylinder in which said piston operates and means for admitting water under pressure to said piston for operating said valve means comprising a waterwheel in a water passage of the regulator, reduction gearing driven by said waterwheel and including a threaded worm-like member, a pivoted arm engaging the thread of said worm-like member, and a valve covering a water port to said piston operated by said arm through travel imparted by said worm-like member.

2. A water regulator comprising a hollow body having a water chamber with an inlet and two outlet passages, connected valve means arranged for closing one of said passages and opening the other alternately, a stem on said valve means provided with a piston, a cylinder in which said piston operates and means for admitting water under pressure to said piston for operating said valve means comprising a waterwheel in a water passage of the regulator, a threaded worm-like member driven by said waterwheel, a movable arm engaging the thread of said member and a valve covering a water port to said piston operated by said arm through motion imparted by said member.

3. A water regulator comprising a hollow body having a water chamber with an inlet and two outlet passages, connected valve means arranged for closing one of said passages and opening the other alternately, a stem on said valve means provided with a piston, a cylinder in which said piston operates and means for admitting water under pressure to said piston for operating said valve means comprising a waterwheel in a water passage of the regulator, a threaded worm-like member driven by said waterwheel, a movable arm engaging the thread of said member, a valve covering a water port to said piston operated by said arm through motion imparted by said member and means for automatically setting said arm at a predetermined point of engagement on said member.

4. In a structure as specified in claim 2 means for withdrawing said arm from engagement with said member and resetting it at any point therealong.

5. In a structure as specified in claim 2 said arm being pivoted to swing in an arc, and said member curved to conform to said arc.

6. In a structure as specified in claim 2 manually operable, means accessible at the outerside of the body for withdrawing said arm from engagement with said member and resetting it at any point therealong.

7. In a structure as specified in claim 2 a return spring in said cylinder operative against said piston, and a vent tube leading from the spring space in said cylinder.

8. In an apparatus of the character described, a hollow body having a water inlet and outlet passages, valve means for controlling said passages, a waterwheel operated by flow of water through the apparatus, timing gear means operated by the waterwheel for actuating said valve means and including a threaded worm, a pivotally mounted arm engaging the thread of said worm for movement thereby, and means for sliding said arm out of engagement with said worm for free rotation and re-engagement with said worm.

9. In an apparatus of the character described, a hollow body having a water inlet and outlet passages, valve means for controlling said passages, a waterwheel operated by flow of water through the apparatus, timing gear means operated by the waterwheel for actuating said valve means and including a threaded worm, a pivotally mounted arm engaging the thread of said worm for movement thereby, and means for sliding said arm out of engagement with said worm for free rotation and re-engagement with said worm, said worm being of double concave hour glass form and said arm pivoted opposite the narrow part of said worm.

10. In a structure as specified in claim 2 a spring actuated plunger operating in a cylinder open at one side to water pressure and having an extension and connections adapted to turn and reset said arm, said plunger being rendered inactive by water pressure while one of the outlet passages is closed.

11. In a structure as specified in claim 2 means for manually adjusting said arm from outside the hollow body comprising a shaft extending out of the body, a slip coupling between the shaft and the arm, and an indicator arm at the outer end of the shaft.

12. In a structure as specified in claim 2 means for manually adjusting said arm from outside the hollow body comprising a shaft extending out of the body, a slip coupling between the shaft and the arm, an indicator arm at the outer end of the shaft and an adjustable stop against which the indicator arm impinges.

13. In a structure as specified in claim 1, means for adjusting the effectiveness of water flow upon said wheel.

DONALD ELDER.